Jan. 16, 1940.  O. W. BURKHARDT  2,187,299
DRESSING OF INDIVIDUAL BLOCKS OF STONE
Filed June 1, 1937  2 Sheets-Sheet 1

Inventor:
Otto Wilhelm Burkhardt
By Young, Emery & Thompson
Attorney

Jan. 16, 1940. O. W. BURKHARDT 2,187,299
DRESSING OF INDIVIDUAL BLOCKS OF STONE
Filed June 1, 1937 2 Sheets-Sheet 2
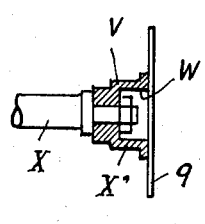
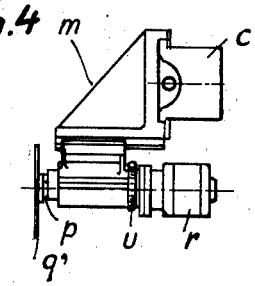
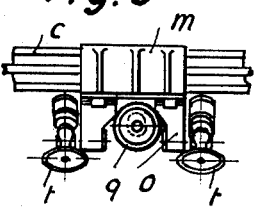
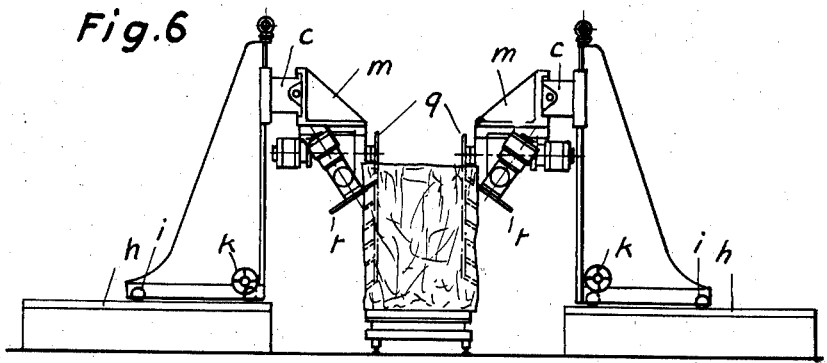
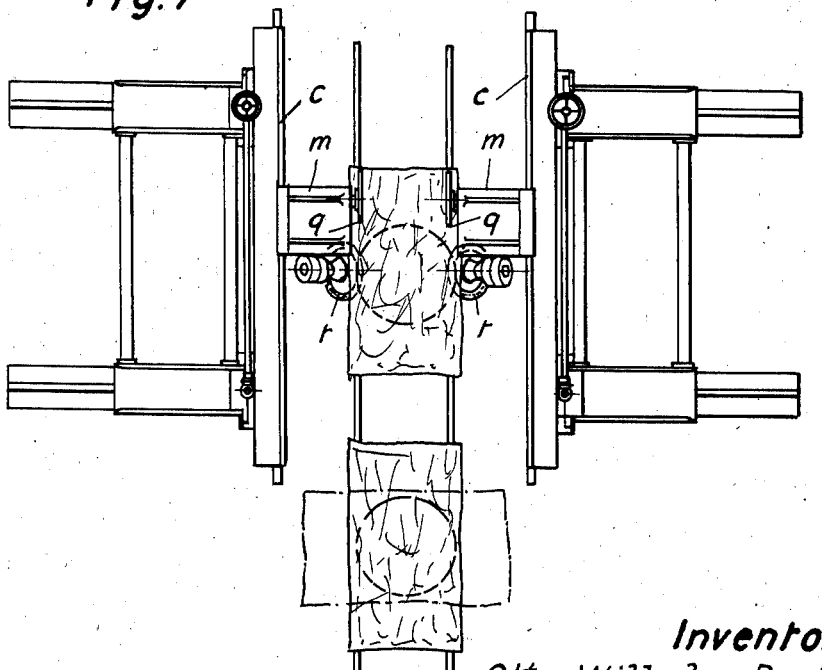
Inventor:
Otto Wilhelm Burkhardt Patented Jan. 16, 1940

2,187,299

UNITED STATES PATENT OFFICE 2,187,299

DRESSING OF INDIVIDUAL BLOCKS OF STONE

Otto Wilhelm Burkhardt, Bayreuth, Germany

Application June 1, 1937, Serial No. 145,899
In Germany August 13, 1935

1 Claim. (Cl. 125—13)

This invention relates to a method of dressing blocks of stone by the so-called crust-cutting process by means of circular saws, and to apparatus serving for carrying out the method.

According to the invention the dressing of stone blocks by crust-cutting is effected in such a way that by means of simultaneously cutting circular saws, arranged at an angle to one another in a manner known in itself, the crust is removed in strips, thus forming plane surfaces. For this purpose there serves apparatus in which circular saws arranged at an angle to one another are so supported on a carriage, which is horizontally movable on a vertically adjustable bridge, that the lower saw, which is inclined, leads the vertical saw, in the cutting direction. The circular saw working in a vertical direction is so constructed that its spindle, on the side facing the stone, does not project beyond the plane of the saw blade.

By means of the method and the apparatus according to the invention, the crusts even of very large work-pieces can be served by circular saws of comparatively small diameter by continuous removal in layers. Completely plane side surfaces of the dressed stone block are thus obtained automatically by this means, so that the surfaces, before polishing, need only be subjected to a slight treatment by grinding. There is therefore a considerable saving of time and expense in production.

A few examples of the invention are illustrated in the accompanying drawings, in which Figure 1 is a side view of the apparatus;

Figure 3 shows in section the attachment of a circular saw to its spindle;

Figure 4 is a partial view of the main supporting slide in side elevation;

Figure 5 is a partial front view showing a modification of the main supporting slide when two inclined saws are provided;

Figure 6 is a side view of a form of the apparatus for dressing both sides of the block of stone at the same time; and Figure 7 is a plan view of this embodiment.

The crust-cutting is effected in such a way that the circular saw $t$ makes the incisions A and the vertical circular saw $q$ makes the incisions B. When both the cuts A and B extend throughout the entire length of the stone block, the piece of crust $c'$ bounded by the cuts A and B falls off. Thereupon the piece of crust D located beneath it is served in a similar manner, and the same procedure is continued until the block of stone is completely dressed on this side, and a smooth and satisfactory side surface obtained.

The circular saw $q$ working in a vertical direction is so mounted upon its spindle $x$ that the end $x^1$ of the spindle lies behind the plane of the saw blade $q$. The other circular saw $t$ is so arranged at an obtuse angle to the saw $q$ that the saw blade is directed upwards towards the stone block from below.

In the crust-cutting the lower saw $t$ is in advance of the vertically working saw $q$, and works at the level that corresponds to the spacing of the cuts each time.

Instead of working with two circular saws arranged at an angle to one another the method according to the invention may also be carried out with one circular saw, which is pivotally arranged in a manner known in itself. In this case the process is subdivided into two stages, in such a way that first, with the saw blade inclined, all the inclined incisions $A^1$, $A^2$, $A^3$ and so forth located one under another are executed, and then, with the saw blade swung into a vertical position, the vertical cleavage cuts B, $B^1$, $B^2$ and so on.

The carrying out of the method with a single oscillatable circular saw has the advantage that a machine with an adjustable circular saw known for other work can be employed for carrying out this process.

The apparatus for putting the method into practice with two circular saws arranged at an angle to one another is built in the following manner:

On the standards $a$ and $b$, connected with one another at a suitable distance apart by transverse members, a horizontal beam $c$ is displaceable up and down a vertical slide track by means of screw spindles $d$ and $e$ co-operating with a nut. The vertical displacement is effected by an electric motor $g$ by means of bevel or worm gearing $f$. The rough lateral adjustment of the standard frame is effected by mounting it upon rollers $i$ running on rails $h$, or by means of sliding carriages displaced by toothed racks or screw spindles, manually by means of a hand wheel $k$ or by an electric motor.

Figure 1:
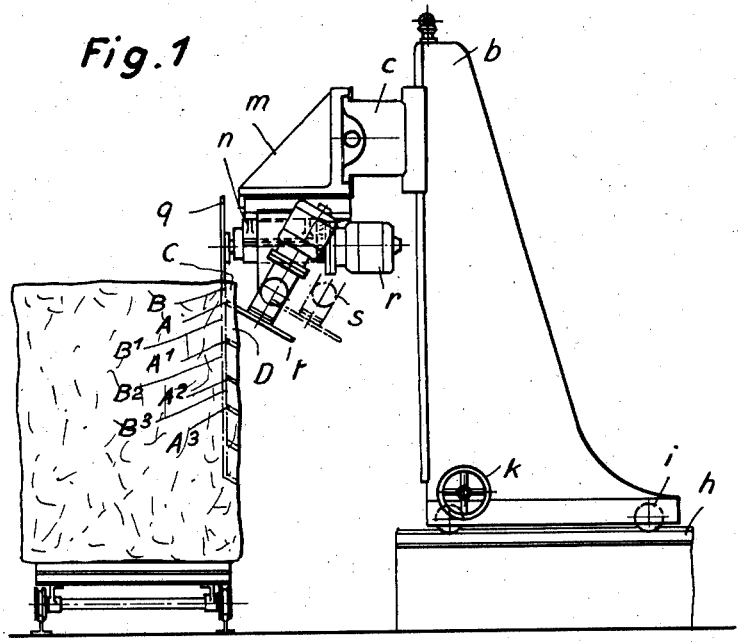
Figure 2:
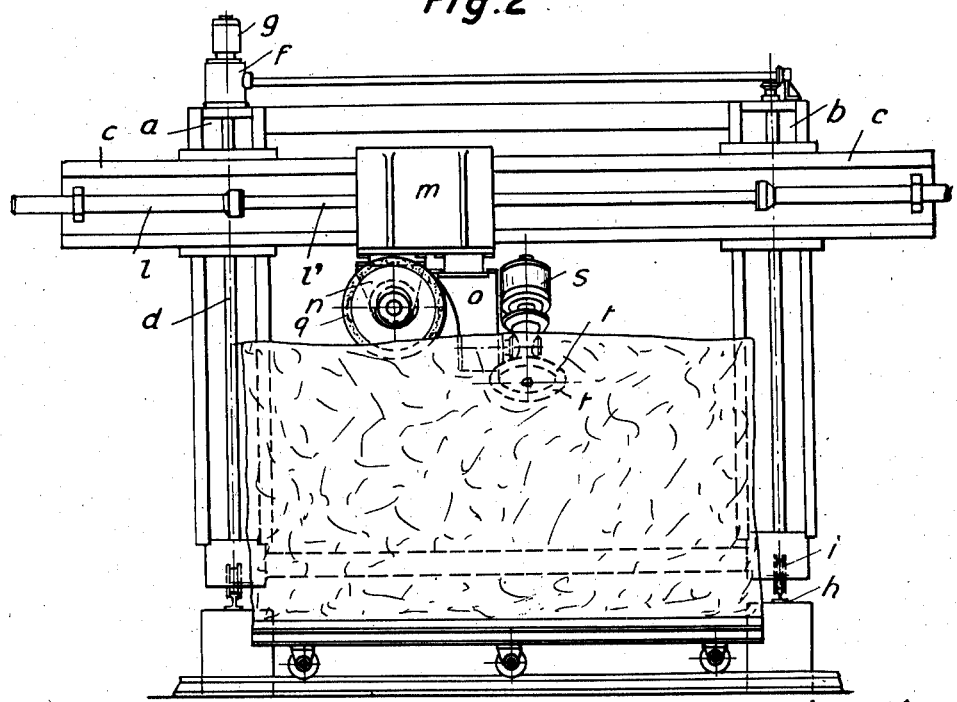
Figure 2 is a front view of the apparatus.

On the guiding gibs of the beam $c$ there slides to and from a main supporting slide $m$, hydraulically driven by means of a cylinder $l$ and a piston $l'$, with an adjustable feeding movement. On this main supporting slide are arranged two lateral supporting slides $n$ and $o$, guided horizontally. The lateral slide $n$ (Figure 1) carries a casing with a working shaft $p$ and a saw blade $q'$, set in rotation by an electric motor $r$.

The saw blade is secured in such a manner that no part of the spindle projects on one side beyond the plane that forms the circle of movement of the outer coating. The wear of the saw blade on the periphery is allowed for by eccentrically mounting the working shaft casing $p$, so that by rotating a worm wheel $u$, shown in Figure 4, the saw blade $q$ can be adjusted into a higher or lower position.

On the second lateral slide $o$ is slidably arranged the tool-holder in which is pivotally supported the working shaft carrying the second saw blade $t$, driven by an electric motor $s$. The fine adjustment of this saw blade is effected by means of a screw spindle and nut on the lateral slide $o$.

The arrangement of the two blades $q$ and $t$ on the main slide $m$ is therefore such that the inclined saw blade $t$ leads the vertical saw blade $p$ in the cutting direction, and consequently in the work-piece the cutting by the inclined saw blade $t$ proceeds in advance of the cutting by the vertical saw blade $q$.

The portion of the work-piece thus cut off drops away as a whole or in pieces, without damaging the cutting disc. After the forward cut the main slide $m$ automatically goes back at the same level. At the end of the backward movement the motor $g$ is set in operation by an electric time switch, the bridge $c$ descends a distance equal to the adjusted cutting depth of the blade, and the working stroke recommences, a second piece, located below the former, being cut away.

If it is desired to cut in layers not in one direction only but to and fro in both directions, this can be attained as illustrated in Figure 7 by providing a further lateral supporting slide, with a rockable working-shaft casing. Then the time switch of the motor $g$ is actuated at each end of the stroke, so that a strip of the work-piece is cut away at every stroke in either direction. The device is however such that only one inclined saw blade exerts a cutting action each time, the operative inclined blade being advanced each time and the inoperative one pushed back. Otherwise the rear saw blade might be injured, according to the structure of the stone, by the pieces of stone falling.

By providing a second unit, erected in symmetrical relationship to the first, two lateral surfaces of the workpiece can be treated simultaneously. This arrangement is illustrated in Figures 5 and 6.

If the carriage carrying the work-piece is equipped with a turntable it is possible, without unclamping the work-piece, to treat two parallel surfaces of the stone, and then two side surfaces at right angles thereto, so that large work-pieces can be automatically treated very accurately and quickly, the production of the finished blocks being thereby considerably cheapened, while at the same time the utmost accuracy of the plane cut surfaces can be ensured.

For work-pieces of less height, in order to cheapen the machine, the beam may be fixedly supported, in which case the main slide must be so arranged as to be displaceable in a vertical direction.

It is likewise possible, though less desirable, on account of the great weight of the work-pieces, to slide the carriage to and from automatically, while the main slide is displaceable in a vertical direction.

Having now particularly described and ascertained the nature of my said invention, and in what manner the same is to be performed, I declare that what I claim is:

A mounting for stone dressing saws comprising a supporting slide, two lateral supporting slides horizontally guided on the first-mentioned supporting slide, a saw blade and motor unit mounted on a horizontal axis on one of the lateral supporting slides for making vertical cuts into the stone, and a saw blade and motor unit mounted on an oblique axis on the other lateral supporting slide for making oblique cuts into the stone, the saw blade and motor unit on the oblique axis being mounted in front of the other saw and motor unit in the cutting direction.

OTTO WILHELM BURKHARDT.